3,000,788
PROPAGATION OF MODIFIED INFECTIOUS CANINE HEPATITIS VIRUS IN TISSUE CULTURES OF PIG KIDNEY AND THE PREPARATION OF A VACCINE THEREFROM

Jerrell B. Emery, Zionsville, Ind., assignor, by mesne assignments, to The Dow Chemical Company, Midland, Mich., a corporation of Delaware
No Drawing. Filed May 15, 1958, Ser. No. 735,386
7 Claims. (Cl. 167—78)

This invention relates to the propagation of an attenuated infectious canine hepatitis virus in tissue cultures of trypsinized pig kidney. More particularly, this invention relates to the propagation in trypsinized tissue cultures of pig kidney of an infectious canine hepatitis virus that has been attenuated by serial passage in tissue cultures of canine kidney.

Still more particularly, this invention relates to the preparation of a vaccine from attenuated infectious canine hepatitis virus that has been propagated in trypsinized tissue cultures of pig kidney.

The attenuation of infectious canine hepatitis virus by serial passage in tissue cultures of canine kidney has been described by Fieldsteel et al. (Fieldsteel, A. Howard, and Emery, Jerrell B., Society for Experimental Biology and Medicine, 1954, vol. 86, 819–823). Fieldsteel et al. also described the preparation of a vaccine from their attenuated infectious canine hepatitis virus that is suitable for immunizing dogs against infectious hepatitis without producing the usual pathological symptoms of the disease.

Fieldsteel et al. attempted the propagation of virulent infectious canine hepatitis virus in pig kidney explants prepared by a plasma clot method, but concluded that there was no virus growth. I have also carried out experiments attempting to propagate virulent ICH virus in tissue cultures of pig kidneys, using the plasma clot method and also trypsinized tissue cultures of pig kidneys, but without success. Quite surprisingly, however, I discovered that the infectious canine hepatitis virus that had been attenuated by serial passage in dog kidney cultures can be propagated in tissue cultures of trypsinized pig kidneys.

My discovery that the attenuated ICH (infectious canine hepatitis) virus can be propagated in trypsinized cultures of pig kidney is of considerable commercial importance. Pig kidneys can be obtained from slaughter houses at a cost that is much lower than the cost of canine kidneys. In addition to being cheaper, the pig kidneys are much more readily available than are dog kidneys. In order to obtain dog kidneys, it is necessary that dogs be sacrificed and the remainder of the dog carcass is a total loss. On the other hand, the carcass of pigs from which pig kidneys can be obtained is usuable as a human food product. The production of a vaccine by propagation of the attenuated ICH virus in pig kidney tissue eliminates the possibility of contamination of the product with histoplasmosis, and other canine diseases which normally could be harbored in dog kidneys but which normally are not harbored in swine.

In carrying out my process for the propagation of attenuated ICH virus, trypsinized cultures of pig kidney in a suitable culture medium are inoculated with ICH virus that has been attenuated by at least fifty serial passages in cultures of dog kidney tissue. After a suitable period of time (five to seven days), the virus-containing fluids are harvested. This liquid material containing a high concentration of attenuated virus can be used directly as a vaccine, and when maintained in a sterile condition, is suitable for producing active and solid immunity in dogs against ICH. When desired, the liquid vaccine can be dried from the frozen state and the dried material diluted at a later time with a liquid diluent for use as a vaccine. The manner in which my invention is carried out will be described in greater detail in conjunction with the following specific experiments. These specific experiments are given by way of illustration and not by limitation.

Propagation of ICH virus in trypsinized pig kidney tissue cultures

Trypsinized cultures of pig kidney were prepared using the process described by Dulbecco and Vogt (Dulbecco, R., and Vogt, M., J. Exp. Med., 1954, V. 99, 167), as modified by Younger (Younger, J., Proc. Soc. Exp. Biol. & Med., 1954, 85:202). Medium employed in culture preparation and maintenance consisted of 8 parts Earles solution (3 parts Earles balanced salt solution sodium chloride 6.8 g., potassium chloride 0.40 g., calcium chloride 0.20 g., magnesium sulfate 0.20 g., sodium acid phosphate 0.125 g., glucose 1.00 g., sodium bicarbonate 2.20 g., water to make 1000 ml.), 1 part 5% lactalbumin hydrolysate, and 1 part inactivated horse serum. Other media which have been found to be satisfactory for initiating and maintaining trypsinized pig kidney cultures are: (a) 8 parts Earles-Simms solution (3 parts Earles BSS to 1 part ox serum ultrafiltrate), 1 part 5% lactalbumin, and 1 part horse serum; and (b) #199 of Morgan, Morton & Parker (Morgan et al., Proc. Soc. Exp. Biol. & Med., 1950, 73:1–8) supplemented with 10% inactivated horse serum.

Virus

Original "starting" virus was modified ICH virus designated at TC70 $LD_{20}44$, with total passages of 134 in trypsinized cultures of dog kidney tissue as described by Fieldsteel et al. Trypsinized pig kidney cultures were maintained by 2 ml. of Earles, lactalbumin and horse serum medium, as previously described above. The pH of the medium was adjusted to 7.6 to 7.8, with incubation of the cultures carried out in roller drum apparatus at 35° C. Passages in the pig kidney culture were carried out at three to seven day intervals by inoculating fresh pig kidney trypsinized cultures with 0.2 ml. of undiluted, pooled fluids from the previous passage.

Harvested and pooled fluids were also inoculated into dog kidney cultures at each passage level to check on the presence and/or survival of the virus.

A cytopathogenic effect resembling that of ICH virus in dog kidney cultures was produced at the 5th passage level in pig kidney cultures.

(a) This effect, although resembling an ICH virus effect, never proceeded to complete destruction of all cells in early passages, but did sporadically produce complete destruction in later passages.

(b) The cytopathogenic effect produced was employed, whenever possible, as a criterion of the time intervals for making future passages. Passages were carried out when 75% to 100% of the epithelial cell outgrowth was involved or destroyed by the virus. Regardless of the amount of the cytopathogenic effect present, ICH virus was always present in titers of at least $10^{-5.0}$.

Identification of this virus as ICH was accomplished at the 7th, 13th, 17th, 34th, and 45th tissue culture passage levels, whereby the cytopathogenic effect produced in pig and dog kidney cultures was neutralized by a known, specific ICH anti-serum.

Titrations of the virus content carried out in dog kidney cultures are as follows:

| Trypsinized Pig Kidney Passage Level | ID of Virus 50 | Dilution of Original Inoculation | Accumulated Dilution |
| --- | --- | --- | --- |
| 7 | $10^{-4.0}$ | $10^{-7.0}$ | $10^{-11}$ |
| 9 | $10^{-5.2}$ | $10^{-9.0}$ | $10^{-14.2}$ |
| 10 | $10^{-5.0}$ | $10^{-10}$ | $10^{-15}$ |
| 45 | $10^{-6.5}$ | $10^{-45}$ | $10^{-51.5}$ |

As shown in the above table, the 45th serial passage in trypsinized pig kidney cultures contains large quantities of the virus, i.e., $10^{-6.5}$. The fluid material containing a high concentration of attenuated virus separated from the tissue material gives a liquid vaccine containing a high concentration of the attenuated ICH virus. The harvested liquid vaccine can be dried from the frozen state to give a dried vaccine material which may be diluted at a later time with distilled water for use in vaccinating susceptible dogs.

The vaccines thus obtained are capable of stimulating the production of protective infectious canine hepatitis anti-bodies, comparable to those produced by natural infections, when injected into non-immune dogs and without producing the usual pathological symptoms of infectious canine hepatitis.

The attenuated ICH virus used in the above studies was attenuated by serial passage on canine kidney tissue cultures. Instead thereof, I can use such attenuated ICH virus that has been propagated on tissue cultures of other canine tissues such as uterus and testicles.

An ICH vaccine prepared in accordance with the Fieldsteel et al. publication is available commercially and can be used satisfactorily as a starting virus for carrying out my invention. The virus present in the commercial ICH vaccine produced by the Fieldsteel et al. process is fully modified to the extent that it will not produce any disease symptoms in ICH susceptible dogs following vaccination therewith, yet does result in immunizing the dogs against virulent ICH virus. The virus in such vaccine has been passed through at least 50 serial passages in canine kidney tissue cultures. I may use as a starting virus in carrying out my present process an infectious hepatitis virus that has been passed through about 45 serial passages in canine kidney tissue cultures, and which virus may still produce some symptoms of the disease in susceptible dogs but has been modified in its growth characteristics in such a manner that it can be propagated on pig kidney tissue cultures in accordance with the present invention. By serial passage through pig kidney tissue cultures, the disease-producing properties are eliminated and the virus becomes fully modified.

The use of low passage (i.e., at least about 40 passages) canine kidney tissue culture-propagated modified ICH virus is illustrated in the following experiments. In one experiment the starting ICH virus had been modified by 45 serial passages in canine kidney tissue cultures in accordance with the Fieldsteel et al. technique. This virus was inoculated into porcine kidney tissue culture tubes using as a medium #199 without serum, and propagation studies carried out. A characteristic cytopathogenic effect was observed in these porcine kidney tissue culture tubes within 4 days. Fluids from these cultures were inoculated in 0.2 ml. amounts into additional tubes for a second passage. After an effect on the porcine cells was observed, this procedure was repeated for a total of 4 passages. A titration of the 3rd tissue culture passage material was conducted in canine kidney tissue culture cells, and found to have an endpoint titer of $10^{-5.0}$. Since each passage represents a 10-fold dilution, infectious canine hepatitis virus was thus demonstrable in a total cumulative dilution of $10^{-8.0}$. Since the starting material had a titer of approximately $10^{-4.7}$, this demonstrated a 2,000-fold increase in virus concentration over the original inoculum.

In another experiment ICH virus that had been modified by 50 serial passages in canine kidney tissue cultures was inoculated in 0.2 ml. amounts into porcine kidney tissue culture tubes containing 2.0 ml. of medium #199 and propagation studies carried out. A specific cytopathogenic effect was observed in these porcine kidney tissue culture tubes within 4 days. At this time, the fluids from these cultures were withdrawn and inoculated in 0.2 ml. amounts into additional porcine kidney tissue culture cells, and simultaneously into canine kidney tissue cultures in order to be certain that the effect observed was due to hepatitis virus.

Again, an effect was observed and the fluid was transferred in the same manner on the 6th day. A similar effect was observed in the 3rd set of cultures on the 5th day, and transfers were again made for the 4th passage in porcine kidney tissue culture cells. The titration of the 3rd porcine kidney tissue culture material was determined to be $10^{-4.7}$. Since each passage represents a 10-fold dilution, this showed a total cumulative dilution of $10^{-7.7}$. Since the starting material had a titer of approximately $10^{-4.7}$, this also demonstrated a 1,000-fold increase in virus concentration.

To show that the porcine kidney-propagated modified infectious hepatitis virus is still avirulent for dogs, three known susceptible dogs were inoculated with 50,000 tissue culture infectious doses of the third porcine kidney tissue culture material. Two additional dogs were inoculated with the fourth porcine passage material. Observations and temperature recordings were taken daily. Throughout a 14-day period of observation, all dogs remained normal. Serum samples taken from these dogs prior to inoculation were devoid of infectious hepatitis antibodies, while samples taken on the 14th day showed development of antibodies, indicating immunity was present.

This work demonstrates that the 50th passage canine kidney tissue culture canine infectious hepatitis virus will propagate readily in porcine kidney tissue culture in concentrations sufficient to be used as a vaccine. This modified live virus, when inoculated into hepatitis-susceptible dogs, did not produce any signs of illness, but did result in immunity.

It is not necessary to use as a starting material, a modified canine infectious hepatitis virus that has been isolated from a dog. A suitable modified virus for carrying out my invention may be prepared using a virulent strain of infectious canine hepatitis virus isolated from a fox suffering from the disease. For example, the following is a description of a successful experiment showing the propagation and modification of a virulent infectious canine hepatitis virus by serial passages through canine kidney tissue cultures to provide a modified virus that is suitable for carrying out my invention:

The ICH virus strain employed for this study was isolated from a fox, and proved to be quite virulent in producing disease in the dog. The virus was passed through canine kidney tissue culture as described above in this application, and the tissue culture virus tested at various intervals by inoculation of susceptible dogs. Dogs inoculated with material through the 12th passage all developed a definite illness, with a high percentage of deaths. A group of 6 dogs were inoculated with the 34th, 36th and 44th tissue culture passages, with none showing signs of illness. These dogs did not have antibodies at the time of inoculation, but did develop a specific antibody titer after inoculation with this tissue culture material. When they were challenged with low tissue culture passage material, that killed control dogs, these animals showed no response. This data provides evidence that other strains besides the ones described earlier in this application can be modified by the use of the same procedure.

To demonstrate the propagation of another strain of

ICH virus in porcine kidney tissue culture, this virus which was isolated from a fox ill with fox encephalitis, a disease produced by the same causative agent as infectious hepatitis of the dog was used. This strain, designated as fox encephalitis ICH virus, was first modified, as shown above, by 45 serial passages in canine kidney tissue cultures in accordance with the Fieldsteel et al. technique. Infected tissue culture fluid of the 45th passage was inoculated into porcine kidney tissue cultures in 0.2 ml. amounts containing #199 medium without serum, and the usual observations carried out. A characteristic cytopathogenic effect was observed in these porcine kidney tissue culture tubes within 4 days. At this time, the fluids from these cultures were withdrawn and inoculated in 0.2 ml. amounts into additional porcine kidney tissue culture cells. Again, an effect was observed, and subsequent transfers were made in the above manner at 3 to 5 day intervals. Titrations were carried out in dog kidney tissue cultures with the starting material and with the 3rd pig kidney tissue culture passage to demonstrate multiplication of the virus. The starting material was found to have an endpoint titer of $10^{-4.0}$, while the 3rd passage was $10^{-3.5}$. Since each passage represents a 10-fold dilution, the fox encephalitis strain of ICH virus was thus demonstrable in a total cumulative dilution of $10^{-6.5}$.

Since starting material possessed a titer of $10^{-4.0}$, a 320-fold increase in virus concentration over the original inoculum was demonstrated, showing that the virus is actively multiplying in porcine kidney tissue culture, and in concentrations sufficient for use in developing a vaccine against infectious canine hepatitis.

As pointed out hereinabove the applicant has attempted the propagation of virulent infectious canine hepatitis virus in trypsinized pig kidney tissue cultures without success. The following is a description of such an experiment:

In this experiment virulent virus—a pool of a 10% suspension in saline—was prepared from the livers of two dogs acutely ill with infectious hepatitis. A portion of this suspension was further diluted to a 1% suspension (to minimize toxicity of the tissue debris on tissue culture cells) and each of 4 pig kidney tissue culture tubes were inoculated with 0.2 ml. of this material. The tubes contained 1.8 ml. of medium #199.

At the same time, a portion of the same suspension used to inoculate this pig kidney tissue culture was titrated in dog kidney tissue cultures to determine the endpoint of infectivity of the liver material.

On the 4th and 7th day after inoculation of the pig kidney tissue cultures with virulent virus, samples were removed from the tubes and also titrated for virus concentration, using dog kidney tissue cultures.

As a control on the ability of the pig cultures to support virus growth, additional pig kidney tissue culture tubes were inoculated with a modified infectious hepatitis virus that had first been passed through 134 dog kidney tissue cultures and then transferred to pig kidney tissue cultures where it had been propagated through 18 passages.

Samples were removed from these tubes also on the 4th and 7th day after inoculation, and titrated in dog tissue cultures. The results of this experiment are summarized in the following table.

| Inoculum | Titer of Inoculum | Titer in Pig Cultures, 0 hrs. | Titer, 4 days | Titer, 7 days |
|---|---|---|---|---|
| Virulent Virus (Dog Tissue) | $10^{-5.5}$ | $10^{-2.5}$ | $10^{-3.3}$ | $10^{-3.0}$ |
| Modified Virus (134th Dog culture 18th Pig culture) | $10^{-6.0}$ | $10^{-3.0}$ | $10^{-3.7}$ | $10^{-5.5}$ |

The data of this table shows that the modified virus readily multiplies in pig tissue culture in satisfactory amounts, while the titer of the virulent virus at the end of 7 days indicates that it has either only survived, or has multiplied at a very low level and not in sufficient concentration to be used for commercial vaccine production.

As proof of the utility of vaccine produced from an attenuated infectious canine hepatitis virus propagated in trypsinized cultures of porcine kidney, a series of 24 dogs were inoculated with porcine kidney tissue culture-propagated virus as described in column 2 of this specification. In each instance, the dogs were inoculated with 5,000 or more tissue culture infectious doses ($TCID_{50}$). The temperatures of each dog were recorded daily, and other observations made. A serum sample was taken from each dog prior to vaccination with this attenuated virus, and again 2 to 3 weeks later.

Only 3 dogs developed a slight febrile response that lasted no more than 1 day. No other signs of illness could be noted. All dogs inoculated with this attenuated virus developed a definite immunity, as shown by a serum-neutralization test. When the dogs inoculated with the attenuated virus were challenged with virulent virus that was capable of killing or sickening control dogs, they remained perfectly normal. For comparative purposes, the control dogs which were inoculated with virulent virus during the course of these experiments all developed a very definite febrile response, as well as other signs of illness, and 50% died. The control dogs that died showed the typical gross pathology of infectious canine hepatitis, and on histological examination, intranuclear inclusion bodies were found in hepatic cells.

This experiment demonstrates that the attenuated infectious canine hepatitis virus propagated in porcine kidney tissue cultures is safe when inoculated into dogs, and is effective in developing an immunity in those dogs so that they are capable of resisting a challenge with virulent virus.

In addition to the propagation of attenuated infectious canine hepatitis virus in porcine kidney, and the preparation of a vaccine therefrom, the passages in porcine kidney tissue cultures have resulted in the development of a virus that is even more modified in its virulence than the one developed in canine kidney tissue cultures. Proof of this fact was established in the following manner:

A series of 6 dogs were inoculated with the 18th passage of the virus in porcine kidney tissue culture. At the time of inoculation, 4 susceptible dogs were placed in the same isolation room with the vaccinated dogs. Daily temperature recordings and other observations were made as usual. All dogs remained normal throughout the period of observation. Serum samples were taken from all dogs at the beginning of the experiment, and again at weekly intervals thereafter. The vaccinated dogs developed a definite antibody titer at 2 weeks, as was to be expected. The contact dogs, however, showed no antibody titer. Again, in the 3rd week's sample, no antibodies could be demonstrated in the sera of the contact dogs. However, in the 4th week's sample a low antibody titer could be detected, indicating that a small quantity of the modified virus had been picked up after prolonged exposure to the vaccinated dogs.

Five weeks after the start of the experiment, and one week after antibodies had been detected in the contact dogs, these contact dogs were removed to a new room and an additional 5 susceptible dogs placed in contact with them. Again, the usual observations were made and serum samples obtained. All dogs remained normal throughout a 7-week observation period. However, the second group of contact dogs did not develop antibodies at any time during this observation period, indicating that they had not picked up any virus from the first contact dogs. They were challenged with virulent virus and found to be fully susceptible to infectious canine hepatitis. The first contact dogs remained normal, indicating that the antibodies detected by the serum-neutralization test were protective antibodies.

This experiment was repeated, using the 34th porcine kidney tissue culture passage. Three dogs were inoculated with this virus, and 2 dogs placed in contact with them. All dogs remained normal as usual during the observation period. Serum samples were taken at the beginning of the experiment, and at weekly intervals thereafter. The vaccinated dogs had developed antibodies when the 2 weeks' sample was tested in the serum-neutralization test. After 4 weeks, evidence of low antibody production was noted in the contact dogs, indicating they had picked up the attenuated virus from the vaccinated dogs. Five weeks after the start of the experiment, these 2 contact dogs were removed to a new room and 3 additional susceptible dogs placed in contact with them. All dogs remained normal throughout a 7-week observation period. No antibodies developed in the second group of contact dogs, indicating they had not picked up virus from the first contact dogs.

The attenuated virus, propagated in canine kidney tissue cultures, is spread from the vaccinated to the contact dogs about 2 weeks after contact was initiated. The attenuated hepatitis virus propagated in canine kidney tissue culture continued to spread from one set of contact backpassage dogs to another. However, as the above tests show, the hepatitis virus propagated in porcine kidney tissue culture has not been picked up beyond the first set of contact dogs. Thus the propagation and passage of the attenuated infectious canine hepatitis virus in porcine kidney tissue cultures further reduced the virulence and invasiveness of the virus to the point where it spread very slowly from inoculated dogs to susceptible dogs during continuous close contact, and will not spread through more than one backpassage. However, even though this strain of virus possessing further attenuated properties has been developed by passages in porcine kidney tissue cultures, the process has not altered its ability to stimulate the development of immunity in inoculated dogs. Hence, it is suitable for the preparation of a vaccine therefrom which is safe and effective.

Thus it is seen that my invention provides a method of preparing a vaccine for immunizing dogs against infectious canine hepatitis, which comprises the steps of introducing an infectious canine hepatitis virus that has been modified by at least 45 (usually about 50) serial passages in tissue cultures of dog kidney, into a pig kidney tissue culture in a nutrient fluid which will support pig kidney tissue growth and which is non-toxic to said virus, incubating said tissue-containing nutrient fluid and allowing the virus to grow therein for a period of at least two days (usually from about 2 to 5 days) and until there has been sufficient growth of the said modified virus to produce a useful concentration thereof, and then harvesting a material containing the virus in relatively high concentration to produce a live modified infectious canine hepatitis virus vaccine.

An outstanding advantage of my invention is the provision of a method of further modifying an ICH virus that has previously been modified by the adaptation and propagation of a virulent ICH virus in tissue cultures of dog kidney, and serial passage therein for at least about 50 passages and until the virus has been rendered non-pathogenic without substantial loss of its antigenicity, but which still possesses the ability to be transferred by contact from one susceptible canine to another susceptible canine, which comprises the steps of introducing said ICH virus, into a pig kidney tissue culture in a nutrient fluid which will support pig kidney tissue growth and which is non-toxic to said virus, incubating said tissue-containing nutrient fluid and allowing the virus to grow therein, removing ICH virus particles from said pig kidney tissue cultures and introducing them into another pig kidney tissue culture as in the first passage and continuing the inoculations and incubation of the ICH virus from one pig kidney tissue culture to another for at least 10 such serial passages and until the virus has lost its ability to be transferred from a susceptible dog inoculated therewith, by contact, to another susceptible dog while remaining non-pathogenic and retaining a high degree of antigenicity.

This application is a continuation-in-part of my copending application Serial No. 576,243, filed April 5, 1956, now abandoned.

I claim:

1. A method of preparing a vaccine for immunizing dogs against infectious canine hapatitis which comprises the steps of introducing an infectious canine hepatitis virus that has been modified by about 50 serial passages in tissue cultures of dog kidney and followed by at least 10 serial passages in tissue cultures of pig kidney into a pig kidney tissue culture in a nutrient fluid which will support pig kidney tissue growth and which is non-toxic to said virus, incubating said tissue-containing nutrient fluid and allowing the virus to grow therein for a period of at least 2 days and until there has been sufficient growth of the said modified virus to produce a useful concentration thereof, and then harvesting a material containing the virus in relatively high concentration to produce a live modified infectious canine hepatitis virus vaccine.

2. A method of preparing a vaccine for immunizing dogs against infectious canine hapatitis which comprises the steps of introducing an infectious canine hepatitis virus that has been modified by at least 50 serial passages in tissue cultures of dog kidney and followed by at least 10 serial passages in tissue cultures of pig kidney into a pig kidney tissue culture in a nutrient fluid comprising medium #199, incubating said tissue-containing nutrient fluid and allowing the virus to grow therein for a period of at least 3 days and until there has been sufficient growth of the said modified virus to produce a useful concentration thereof, and then harvesting a material containing the virus in relatively high concentration to produce a live modified infectious canine hepatitis virus vaccine.

3. A method of preparing a vaccine for immunizing dogs against infectious canine hapatitis which comprises the steps of introducing an infectious canine hepatitis virus that has been modified by at least 50 serial passages in tissue cultures of dog kidney and followed by at least 10 serial passages in tissue cultures of pig kidney into a pig kidney tissue culture in a nutrient fluid comprising a mixture of medium #199 and inactivated horse serum, incubating said tissue-containing nutrient fluid and allowing the virus to grow therein for a period of at least 3 days and until there has been sufficient growth of the said modified virus to produce a useful concentration thereof, and then harvesting a material containing the virus in relatively high concentration to produce a live modified infectious canine hepatitis virus vaccine.

4. A method of further modifying an infectious canine hepatitis virus that has previously been modified by the adaptation and propagation of a virulent infectious canine hepatitis virus in tissue cultures of dog kidney and serial passage therein for at least about 50 passages and until the virus has been rendered non-pathogeninc without substantial loss of its antigenicity, but which still possesses the ability to be transferred, by contact, from one susceptible canine to another susceptible canine, which comprises the steps of introducing said infectious canine hepatitis virus into a pig kidney tissue culture in a nutrient fluid which will support pig kidney tissue growth and which is non-toxic to said virus, incubating said tissue-containing nutrient fluid and allowing the virus to grow therein, removing infectious canine hepatitis virus particles from said pig kidney tissue cultures and introducing them into another pig kidney tissue culture as in the first passage and continuing the inoculations and incubation of the infectious canine hepatitis virus from one pig kidney tissue culture to another for at least 10 such serial passages and until the virus has lost its ability to be transferred fro m a susceptible dog inoculated therewith, by contact, to another susceptible dog while remaining non-pathogenic and retaining a high degree of antigenicity.

5. A vaccine for immunizing dogs against infectious canine hepatitis comprising a dry stable mixture of a live modified infectious canine hepatitis virus that was modified by the steps of introducing an infectious canine hepatitis virus that has been modified by about 50 serial passages in tissue cultures of dog kidney and followed by at least 10 serial passages in tissue cultures of pig kidney into a pig kidney tissue culture in a nutrient fluid which will support pig kidney tissue growth and which is non-toxic to said virus, incubating said tissue-containing nutrient fluid and allowing the virus to grow therein for a period of at least 2 days and until there has been sufficient growth of the said modified virus to produce a useful concentration thereof, and then harvesting a material containing the virus in relatively high concentration.

6. A method of further modifying an infectious canine hepatitis virus that has previously been modified by the adaptation and propagation of a virulent infectious canine hepatitis virus in tissue cultures of dog kidney and by serial passage through several separate dog kidney tissue cultures until the virus has been rendered non-pathogenic without substantial loss of its antigenicity, but which still possesses the ability to be transferred, by contact, from one susceptible canine to another susceptible canine, which comprises the steps of introducing said infectious canine hepatitis virus into a pig kidney tissue culture in a nutrient fluid which will support kidney tissue growth and which is non-toxic to said virus, incubating said tissue-containing nutrient fluid and allowing the virus to grow therein, removing infectious canine hepatitis virus particles from said pig kidney tissue cultures and introucing them into another pig kidney tissue culture as in the first passage and continuing the inoculations and incubation of the infectious canine hepatitis virus from one pig kidney tissue culture to another for at least 10 such serial passages and until the virus has lost its ability to be transferred from a susceptible dog inoculated therewith, by contact, to another susceptible dog while remaining non-pathogenic and retaining a high degree of antigenicity.

7. A vaccine for immunizing dogs against infectious canine hepatitis comprising a dry stable mixture of a live modified infectious canine hepatitis virus that was modified by the steps of introducing an infectious canine hepatitis virus that has been modified by passing live canine hepatitis virus through several separate tissue cultures of dog kidney and followed by at least 10 serial passages in tissue cultures of pig kidney into a pig kidney tissue culture in a nutrient fluid which will support pig kidney tissue growth and which is non-toxic to said virus, incubating said tissue-containing nutrient fluid and allowing the virus to grow therein for a period of at least two days and until there has been sufficient growth of the said modified virus to produce a useful concentration thereof, and then harvesting a material containing the virus in relatively high concentration.

References Cited in the file of this patent

Fieldsteel et al.: Pro. Soc. Exptl. Biol. and Med., 86:4, August–September 1954, pp. 819–823.